United States Patent [19]

Pole et al.

[11] 4,126,456
[45] Nov. 21, 1978

[54] VISUAL IMAGE RECORDING DEVICE

[75] Inventors: Robert V. Pole, Los Gatos; Meredith D. Shattuck; Glenn T. Sincerbox, both of San Jose; Harald W. Werlich, Los Gatos, all of Calif.

[73] Assignee: International Business Machines Corporation, Armonk, N.Y.

[21] Appl. No.: 582,045

[22] Filed: May 29, 1975

[51] Int. Cl.² .............................................. G03G 5/02
[52] U.S. Cl. .................................... 96/1 E; 40/52 R; 350/356; 350/357; 355/3 R; 354/3
[58] Field of Search ......................... 96/1 E; 40/52 R; 350/160 R; 354/3

[56] References Cited

U.S. PATENT DOCUMENTS

| | | | |
|---|---|---|---|
| 3,879,197 | 4/1975 | Barlett et al. | 96/1 E |
| 3,970,365 | 7/1976 | Giglia | 350/160 R |
| 3,971,624 | 7/1976 | Bruesch et al. | 350/160 R |

Primary Examiner—Leland A. Sebastian
Attorney, Agent, or Firm—Otto Schmid, Jr.

[57] ABSTRACT

A direct view display device comprises a pair of conductive electrodes in spaced relationship and a recording medium having the properties of being both photoionizable and capable of electro-chemically producing colored species occupies the space between the electrodes. The display device is exposed to an optical pattern of radiation to which the recording material is sensitive to produce a latent image, and a potential is applied between the electrodes to produce a very dense image corresponding to the optical pattern. The image can be erased by reversing the potential between the electrodes so that the expose and enhance process can be repeated.

10 Claims, 8 Drawing Figures

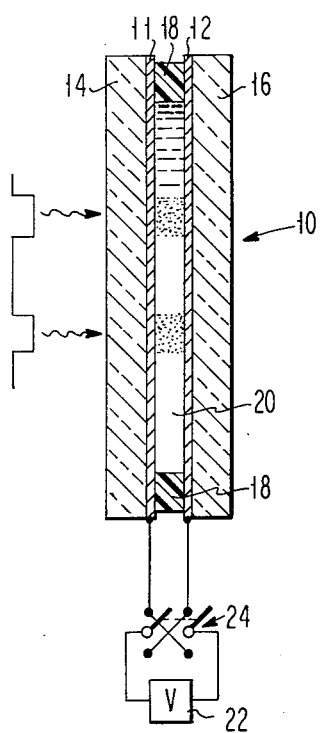
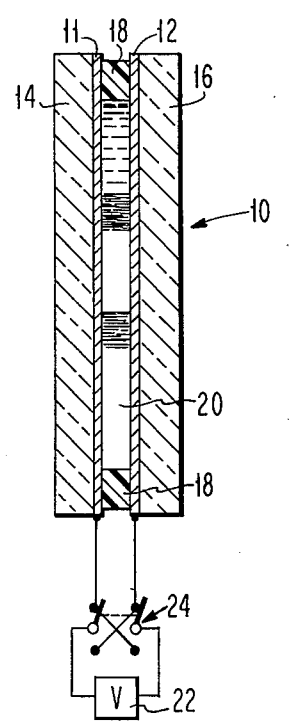
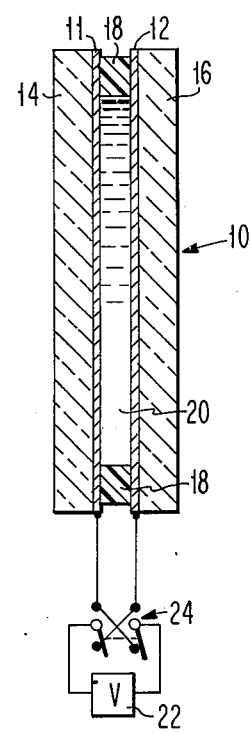
FIG.1a    FIG.1b    FIG.1c
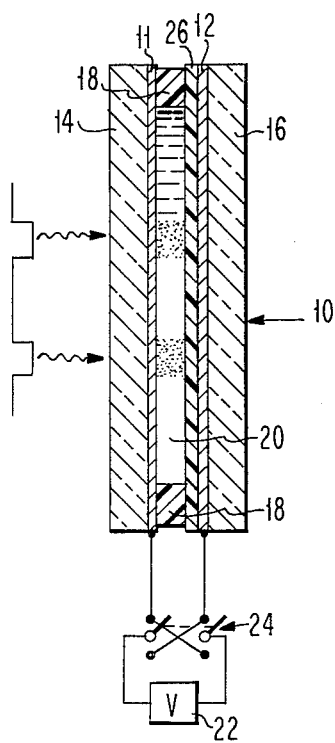
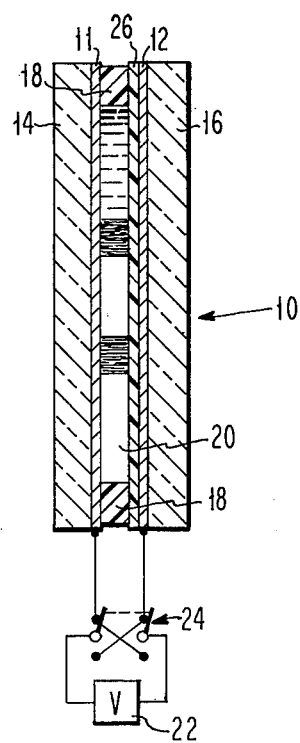
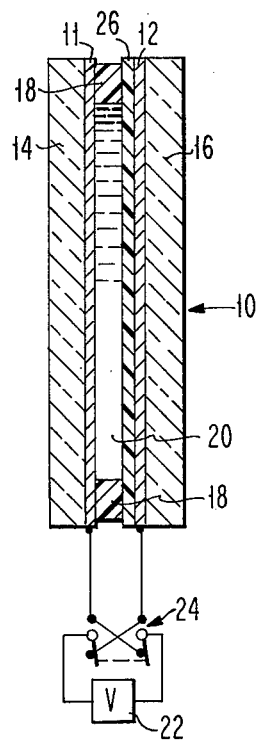
FIG.2a    FIG.2b    FIG.2c

VISUAL IMAGE RECORDING DEVICE

BACKGROUND OF THE INVENTION

This invention relates to an optically addressable direct view display device and the method for producing a visible image with the display device.

Many different approaches to direct view display devices are known. One approach is to use a photochromic material in a display device to produce a direct view image. However, these devices are of relatively low optical sensitivity and require the use of thermal or in some cases visible radiation to erase the image and allow subsequent reuse.

The prior art also teaches the use of structural electrode arrays to produce electrochromic images in the form of characters and images. There is a one-to-one correspondence between the electrodes or activated electrode segment and the resulting image. This in general reduces the versatility of the device due to preconfiguration requirements and also presents certain difficulties in addressing and driving the display.

Another approach is to use a device with a photoconductive material overlaying an electrochromic material. The optical image reduces the resistance of the photoconductive material in the exposed area so that the corresponding area of the electrochromic material is energized by a voltage across the cell. This configuration solves the electrode problem of electrochromic devices but requires a more complex structure due to the layered structure. The materials must be selected for compatibility with all the other materials. Furthermore, the exposure and application of the voltage must be simultaneous unless a persistent photoconductor is used.

It is therefore a primary object of this invention to provide an improved direct view display device which is operable in response to low optical energy density.

It is a further object of this invention to provide a direct view display device which forms a latent image in response to optical energy which subsequently can be developed into a highly dense image.

It is another object of this invention to provide a direct view display device which can easily be erased and reused.

It is also an object of this invention to provide a method for producing a visible image by first producing a latent image in response to optical energy and developing the image into a highly dense image.

It is another object of this invention to provide materials suitable for use in the method.

SUMMARY OF THE INVENTION

This invention comprises a direct view display device which includes a pair of conductive electrodes in spaced relationship and a suitable recording medium occupying the space between the electrodes. The recording medium exhibits the properties of being photo-ionizable and capable of electro-chemically producing colored species. The image is produced by exposing the medium to an optical pattern of activating radiation of an intensity suitable to produce a latent image of the pattern and then applying a low voltage of a first polarity across the electrodes to produce a very dense image corresponding to the pattern. The image can be erased by applying a low voltage of opposite polarity across the electrodes and the display device can then be reused.

BRIEF DESCRIPTION OF THE DRAWINGS

FIGS. 1a, 1b and 1c are cross-sectional views of the display device embodying the invention showing, respectively, the write, enhance and erase steps of the imaging process;

FIGS. 2a, 2b and 2c are cross-sectional views of an alternate embodiment of the display device embodying the invention showing, respectively, the write, enhance and erase steps of the imaging process;

DESCRIPTION OF THE PREFERRED EMBODIMENTS

Figure 3:
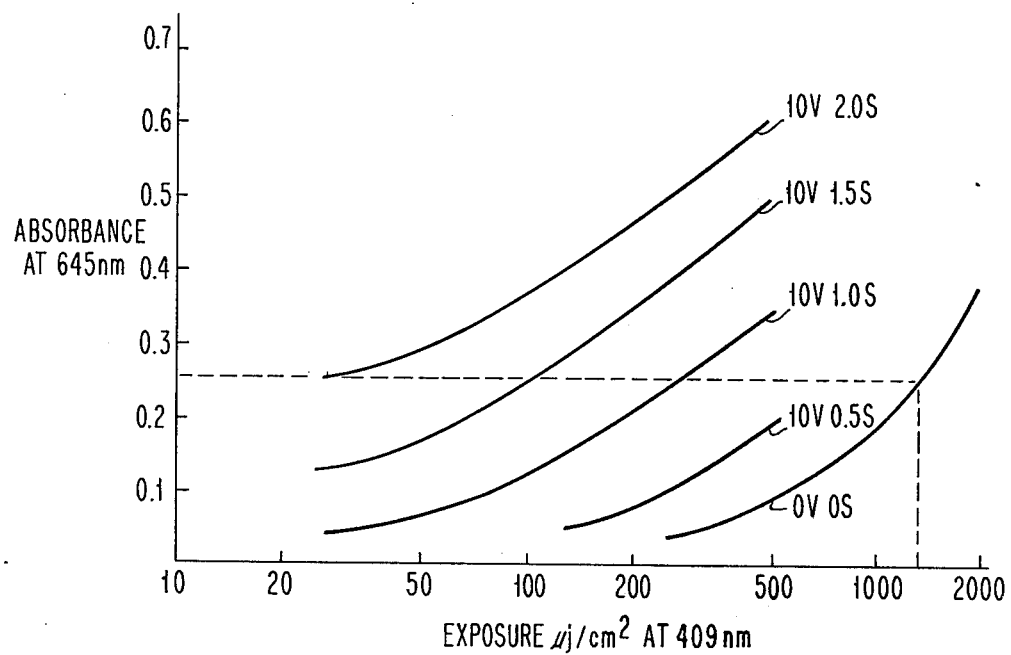
FIG. 3 is a graph which shows the relationship of absorbance of a specific recording medium in the display device of FIG. 2 as a function of exposure and various voltage/time enhancement conditions.

The display device comprises two conductive electrodes in spaced relationship and a suitable recording medium occupying the space between the electrodes. In the embodiment of the display device 10 shown in FIG. 1, the conductive electrodes comprise suitable transparent conductive coatings 11, 12 on a suitable substrate 14, 16 such as glass. The spacing between the electrodes is maintained by a suitable spacer member 18 and the recording material 20 is included in the space enclosed by the electrodes 11, 12 and the spacer member 18. The thickness of the cell is normally in the range of 50 to 100 $\mu$m, and this thickness is chosen on the basis of the desired response time, resolution and other characteristics chosen for a specific display device.

The recording medium 20 exhibits the properties of being both photo-ionizable and capable of electro-chemically producing colored species. The recording medium 20 includes an active material. A number of suitable active materials have been discovered such as a triaryl pyrazolines, spiropyrans and redox polymeric materials, and these materials will be fully disclosed below. The recording medium 20 at present includes a solvent and in most cases an activator. An activator is not necessary with the spiropyrans.

The display cell 10 is fully transparent under ambient lighting. However, when a region of the cell is exposed by a light distribution as shown in FIG. 1a to light of a wavelength to which the material 20 is sensitive with an energy density of about 10 to 50$\mu$ joules/cm$^2$, a latent image is produced in the irradiated region.

Image enhancement comprises a conversion of the latent image into a high density and high contrast visible image, and the enhancement is achieved by the momentary application of a potential to the display cell which results in a subsequent production of colored species in those areas that had been exposed to light. In the embodiment shown, the enhancement is accomplished by the application of a potential of 2 to 20 volts from voltage source 22 by switch 24 to the cell, as shown in FIG. 1b, so that the coloration in the same region is intensified. The intensification is proportional to the applied voltage and the duration of its application as can be seen from the graph in FIG. 3.

Figure 4:
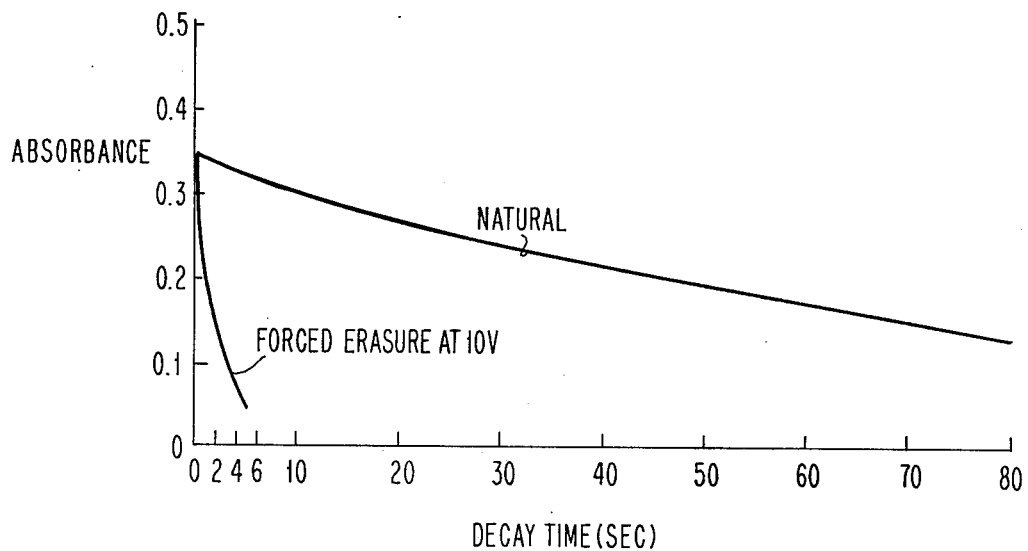
FIG. 4 is a graph which shows both natural decay and forced erasure characteristics for a typical display device embodying the invention.

The persistence of the coloration is in the order of minutes as can be seen by the upper curve in FIG. 4. The colored species can be forcefully bleached as shown in the lower left curve in FIG. 4 and in FIG. 1c on the order of one second by reversing the potential on the cell by switch 24. The expose and enhance process can then be repeated.

The arrangement of electrodes 11, 12 has an effect on the operation of the display cell, and this effect differs for different ones of the active materials in the recording medium. For example, if the triaryl pyrazoline group of materials is used and the electrodes are of the same material (indium oxide, for example) then the image can be enhanced as shown in FIG. 1b, but the image cannot be forcefully erased as shown in FIG. 1c. This is due to the fact that as bleaching of the color occurs at one electrode, a complementary coloring takes place at the opposite electrode under application of a prolonged erase voltage. However, if one uses a suitable set of dissimilar electrodes (indium oxide and aluminum, for example) then both enhancing and erasure can be accomplished.

When using the spiropyran material, the image can be erased but not enhanced by the use of similar electrodes. However, again, both enhancement and erasure can be accomplished with a suitable set of dissimilar electrodes.

The dependency on electrode materials can be eliminated by the embodiment of the invention shown in FIG. 2. The image device shown in FIG. 2 is similar in structure to the device previously described except that a barrier layer 26 is included between the electrodes 11, 12 and adjacent one of the conductive electrodes. The barrier layer not only introduces the asymmetry into the display cell necessary for erasure, but also increases both photochromic sensitivity and enhancement efficiency. The barrier layer comprises a suitable matrix such as a polymer which contains an appropriate amount of a material that is readily oxidizable and reducible, but does not change its color during the erase cycle.

Several techniques for forming a barrier layer on one of the conductive electrodes are known and they include methods such as dip coating, spin coating and use of a doctor blade. The most uniform and reproducible coatings have been obtained by dip coating. Using a formulation consisting of: 10% 8061 Elvamide nylon resin (a polyamide resin) in methanol and 0.5% zinc nitrate, (with respect to total resin/solvent weight), barrier layers of 2μ thickness have been formed at a dip speed of 10cm/min. The coated electrodes are then heat cured at 65°-70° C. for 10 minutes to remove excess solvent. The resulting barrier is optically transparent and free from bubbles and surface reticulation. The amount of redox substance in the completed barrier layer can vary from about 1% to about 60% but the preferred amount is from about 20% to about 40% by weight. Other polymer and redox substances can be used such as a sulfonated polystyrene polymer and zinc chloride lead nitrate and cadmium nitrate redox substances. Other similar known redox substances should be operable provided they are not soluble in the solvent used in the recording medium.

The recording medium 20 contains a solvent, an active material and in most cases an activator. An activator is not necessary with the spiropyrans.

Suitable solvents are halogenated hydrocarbon solvents and other non-aqueous solvents such as acetonitrile. Preferred solvents are chloroform, 1, 2, dichloroethane, dichloromethane and mixtures thereof.

Activators may be polyhalogenated alkanes such as carbon tetrachloride, carbon tetrabromide, iodoform and bromoform, and other polyhalogenated compounds such as 2, 2, 2- tribromethanol and dichloracetone. The solvent can also act as the activator in some cases. The concentration of the activator, if necessary, depends upon the particular compound used and the solvent employed. The activator concentration may be as low as 1 wt % with some solvents and as high as on order of 50 wt % with other solvents.

Active materials contemplated for use in this invention can be selected from any of a number of active materials which demonstrate the properties of being both photo-ionizable and capable of electro-chemically producing colored species. The active materials that can be used at the present time fall within one of three groups or classes of chemical compounds. These groups are the triaryl pyrazolines, spiropyrans and redox polymeric materials.

The preferred concentration of the active materials is 3 to 20 wt %. The concentration can be higher or lower than the preferred range based on solubility and desired visual contrast considerations.

The triaryl pyrazolines are the most effective active materials. Specific compounds of this group which are effective are 1-phenyl 3-p-diethylaminostyryl-5-p-diethylamino-phenyl-2-pyrazoline (hereinafter referred to as DEASP), 1-p-anisyl-3-p-diethylaminostryryl-5-p-diethylaminophenyl-2-pyrazoline (hereinafter referred to as M-DEASP), and 1-phenyl-3-p-piperdinophenyl-5-(2-thiophenyl)-2-pyrazoline.

Other triaryl pyrazoline compounds having the structure shown below which demonstrate the properties of being both photo-ionizable and capable of electro-chemically producing chemical species are included.

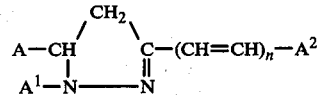

wherein $n$ is 0 or 1, and $A, A^1$ and $A^2$ are each aryl radicals.

In this formula when $n = 1$ the materials may be classified chemically as styryl pyrazolines. It is preferred that one or more of the aryl groups be substituted, most preferably with groups known in the art to be electron donating groups. The most preferred substituent groups are methoxy, ethoxy, dimethyl amino, diethyl amino and the like. It is not preferred to substitute the aryl groups with electron withdrawing groups such as nitro and cyano.

A large number of compounds in this group have been screened for their photo-ionizable characteristics to determine the peak wavelength of the color species. Among the compounds which have shown this photo-ionizable effect and which are potentially useful for this application are the following:

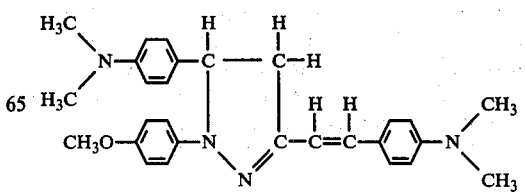

-continued

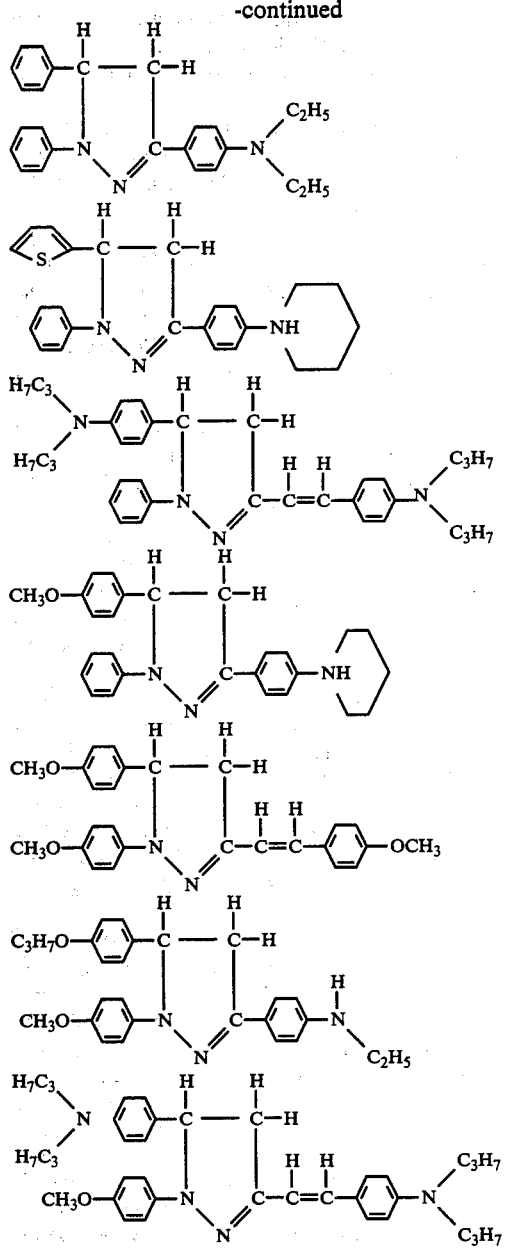

EXAMPLE 1

A simple display cell consists of two indium oxide coated glass plates, one of which is also overcoated with a thin layer (several microns) consisting of a small amount of $Zn(NO_3)_2$ dissolved in a polyamide resin.

The uncoated and the barrier coated conductive plates are separated by a 50 to 100 μm thick Mylar spacer. The two substrates are laterally displaced so that the two electrodes could be contacted with suitable connector clips.

The thin cell between the electrodes is filled with e.g. a chloroform solution containing 0.15M M-DEASP and 0.32M carbon tetrachloride. Where M-DEASP stands for 1-p-Anisyl-3-p-diethylaminostryryl-5-p-diethylaminophenyl-2-pyrazoline.

This cell is fully transparent under yellow illumination. However, when a region of the cell is irradiated with a beam of blue light of 400nm wavelength and an energy density of 10 to 20 μjoules/cm² a faint blue-green coloration of the liquid will be induced in the irradiated region. If now a potential of 10 to 20 volts is applied to the cell, the coloration in the same region will be intensified; the intensification being proportional to the applied voltage and the duration of its application, or more precisely—to the total charge injected into the cell. The colored species will gradually bleach and diffuse. The persistence, however, is in the order of minutes, and increases as the temperature of the cell is lowered. By reversing the potential on the cell the colored species can be forcefully bleached in less than one second. The expose and enhance process can then be repeated all over again.

EXAMPLE 2

The display cell of Example 1 was irradiated by a He-Cd laser at 441 nm. A high contrast image was obtained by the application of a voltage as in Example 1.

EXAMPLE 3

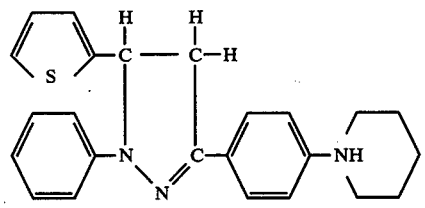

A solution containing 1.5 parts 1-phenyl-3-[p-piperdino phenyl]-5-[2-thiophenyl]-2-pyrazoline, 20 parts chloroform and 1.2 parts carbon tetrabromide was placed between parallel plate electrodes. Both electrodes consisted of tin oxide coated glass one of which was coated with a 1 micron layer of Elvamide T.M. 8061 (a DuPont nylon resin) containing 5% zinc nitrate. The electrodes were separated by a 75 micron Mylar spacer. The solution was exposed to ultra violet light to produce a latent image. A potential of about (+)5 volts was then applied to the noncoated conductive glass plate. A magenta (reddish blue) image appeared in the previously exposed areas. The potential was reversed and the image was erased.

EXAMPLE 4

1-phenyl-3-p-diethylamino stryryl-5-p-diethylaminophenyl-2-pryazoline or DEASP

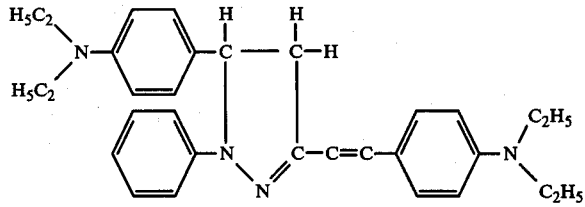

A solution containing 2 parts DEASP, 40 parts chloroform and 1 part carbon tetrabromide was placed between conductive plates consisting of tin oxide coated glass. A 75 micron Mylar spacer was used to separate the electrodes and provide space for the solution. The solution was exposed to blue light filtered to give a peak wavelength of about 400 μm at about 60 μw/cm² intensity. A 1/60 second exposure was used. Development of the latent image was obtained by applying a positive DC potential of about 10 volts. A dense green image appeared in the areas which have received light. The background areas or unexposed areas remained a pale yellow.

A second type of compound suitable for use in this type of device is the spiropyrans. One compound of this type is 1',3',3'-trimethyl-6-nitrospiro[2H-1-benzopyran-2,2'-indolene].

EXAMPLE 5

A solution containing 1',3',3'-trimethyl-6-nitrospiro [2H-1-benzopyran-2,2'-indoline] 2 parts; Staybelite Ester 5, (a glycerol ester of hydrogenated rosin manufactured by Hercules Power Co.) 8 parts; and tetrahydrofuran 25 parts, was placed between an electrode configuration consisting of a tin oxide coated glass as one electrode and polyurethane coated (about $0.1\mu$ thick) aluminized Mylar as the opposite electrode. the electrodes were separated by a 5 mil Mylar spacer. The solution was exposed to ultra violet light emitted from a mercury arc source. A faint blue image was obtained in the areas receiving light. Application of voltage produces an increase in color density. Reversal of polarity used to increase contrast bleaches the color so that a colorless solution is obtained.

A third type of compound suitable for use in this type of device is a redox polymeric material. One compound of this type is 3-vinyl-10-methyl phenothiazine.

EXAMPLE 6

A 5% solution of 3-vinyl-10-methyl phenothiazine in chloroform was placed between a configuration of tin oxide coated glass electrodes. This solution was exposed to ultraviolet light emitted from a mercury arc source. A latent image was obtained in the area receiving light. The application of voltage produced a visible image.

The mechanism of the photo-chemical and electrochemical process taking place in the display device are not yet fully understood, but following is our present understanding of the mechanism. However, we do not wish to be limited by our present understanding of the mechanism. The key to the process is the active material in the recording medium, and, since triaryl pyrazoline is the preferred material, that material will be used as an example for this description.

The properties of interest in this application are that the particular M-DEASP molecule can be readily oxidized into a long-lived radical cation in the presence of a suitable electron acceptor either optically or electro-chemically; the resulting cation exhibits strong absorption in the visible and is readily reduced to the neutral molecule electro-chemically. The irradiation of the recording medium with light of 400nm wavelength which corresponds to the long wavelength electronic absorption peak of the M-DEASP molecule, and approximately so to the simpler DEASP molecule, promotes the molecule in its first electronic excited state. This transition is apparently due to the intramolecular charge transfer through the 1,3-conjugated system of the molecule. In the presence of nonhalogenated solvents such as THF, methanol, ethanol, etc., the excited state is deactivated by fluorescence and on blue colored radicals are formed. However, in the presence of chloroform and carbon/tetrachloride, the fluorscence is quenched and the excess energy of the excited molecule leads apparently to the photo-oxidation of the pyrazoline and the dissociative electron attachment to chloroform; $CHCl_3 + e^- \rightarrow CHCl_2 \cdot Cl^-$ and/or $CCl_4$. Since the latter dissociation reaction is exothermic, that and the solvation energy of the ionic products may be the sources of additional energy needed for de-electronation of the pyrazoline molecule.

The resulting generation of both pyrazoline cations and chloride anions increases the ionic conductivity in the irradiated portion of the cell. This decreases the IR potential drop across the solution and increases the interfacial potential drop. This, in turn, leads to the increased electrode-solution interfacial fields, subsequent charge tunneling and an anodic oxidation of the remaining neutral pyrazoline molecules. The final result is, of course, an increase of the optical density in the irradiated portion of the cell providing for photographic type of "gain."

This "gain" can be best understood by referring to FIG. 3 which shows typical response characteristics to the enhancing voltage. The lower curve, labeled $0^v0^{sec}$, represents the initial photochromic density and each successively higher curve the density as a result of the application of 10 volts for the indicated lengths of time. Of particular significance is the very low exposure region where an exposure of 25 $\mu j/cm^2$, insufficient to produce any measurable absorbance, can be enhanced to an absorbance of 0.26. If this result is compared with the $0^v0^{sec}$ curve of FIG. 3, it is readily seen that to produce the same absorbance by optical exposure alone an exposure of $1.3 mj/cm^2$ is required — a gain factor of 50x. It should be noted that the data shown in FIG. 3 does not represent an attempt to optimize the voltage/time trade-offs but rather are presented as typical enhancement characteristics. Consequently, an upper limit for the gain factor in this process is not determinable at this point.

As in the case of other pyrazoline derivatives, the cations of M-DEASP can be (reversibly) reduced at the cathode. Thus, the reversal of the potential would immediately lead to the reduction and consequent bleaching of the cations in the vicinity of the former anode. However, as long as the cell is symmetrical, new colored species would be simultaneously formed at the other electrode. This symmetry is removed in the display cell by the presence of $Zn(NO_3)_2$ — doped polyamide barrier that effectively acts as an electro-chemical half-cell in which the $Zn(NO_3)_2$ plays the role of the complementary redox system with no color generation during either oxidation or reduction cycle.

The role of $CCl_4$ in the system is not quite clear, since the system works with M-DEASP in $CHCl_3$ alone. However, we have observed that the presence of $CCl_4$, apparently due to its lower dielectric constant, lowers the conductivity of the non-irradiated portion of the cell and consequently secures better contrast of the produced images.

While the invention has been particularly shown and described with reference to preferred embodiments thereof, it will be understood by those skilled in the art that various changes in the form and details may be made therein without departing from the spirit and scope of the invention.

We claim:

1. A visual image recording device comprising:
   a pair of conductive electrodes in spaced relationship;
   a voltage source and means for selectivity applying this voltage between the electrodes to produce an electric field;

a normally light transmitting recording medium occupying the space between said electrodes, said medium having the properties of being both photo-ionizable and capable of electrochemically producing colored species;

means for exposing said medium to a pattern of activating radiation of an intensity sufficient to produce a latent image of said pattern, and means to apply the voltage of a first polarity between said electrodes to produce an enhanced visual image corresponding to said pattern.

2. The visual image recording device according to claim 1 additionally comprising:

means for applying a voltage of a polarity opposite to said first polarity between said electrodes to erase said image corresponding to said pattern.

3. The visual image recording device according to claim 1 wherein said recording medium comprises:

an active material, a solvent and an activator.

4. The visual image recording device according to claim 3 wherein said active material is a triaryl pyrazoline.

5. The visual image recording device according to claim 4 wherein said triaryl pyrazoline is 1-phenyl 3-p-diethylaminostyryl-5-p-diethylamino-phenyl-2-pyrazoline.

6. The visual image recording device according to claim 4 wherein said triaryl pyrazoline is 1-p-anisyl-3-p-diethylaminostryryl-5-p-diethylaminophenyl-2-pyrazoline.

7. The visual image recording device according to claim 1 additionally comprising:

a barrier layer mounted between said conductive electrodes adjacent to one of said electrodes.

8. The visual image recording device according to claim 7 wherein said barrier layer comprises:

a polyamide resin containing 1 to 60 weight percent of a redox substance.

9. The process for producing a visible image on an image device comprising the steps of:

confining a radiation sensitive medium in an image device, said radiation sensitive medium having the properties of being both photo-ionizable and capable of electrochemically producing colored species;

exposing the image device to an optical image pattern to which said medium is sensitive to produce a latent image corresponding to said pattern; and producing an electric field of a first polarity across the image device to enhance the optical density of the image.

10. The process for producing a visible image according to claim 9 comprising the additional step of:

producing an electric field of a polarity opposite to said first polarity across the image device to erase the image.

* * * * *